April 28, 1953 S. SCHNELL 2,636,349
INJECTOR PUMP ASSISTED HYDRAULIC BRAKING SYSTEM
Filed Dec. 31, 1948
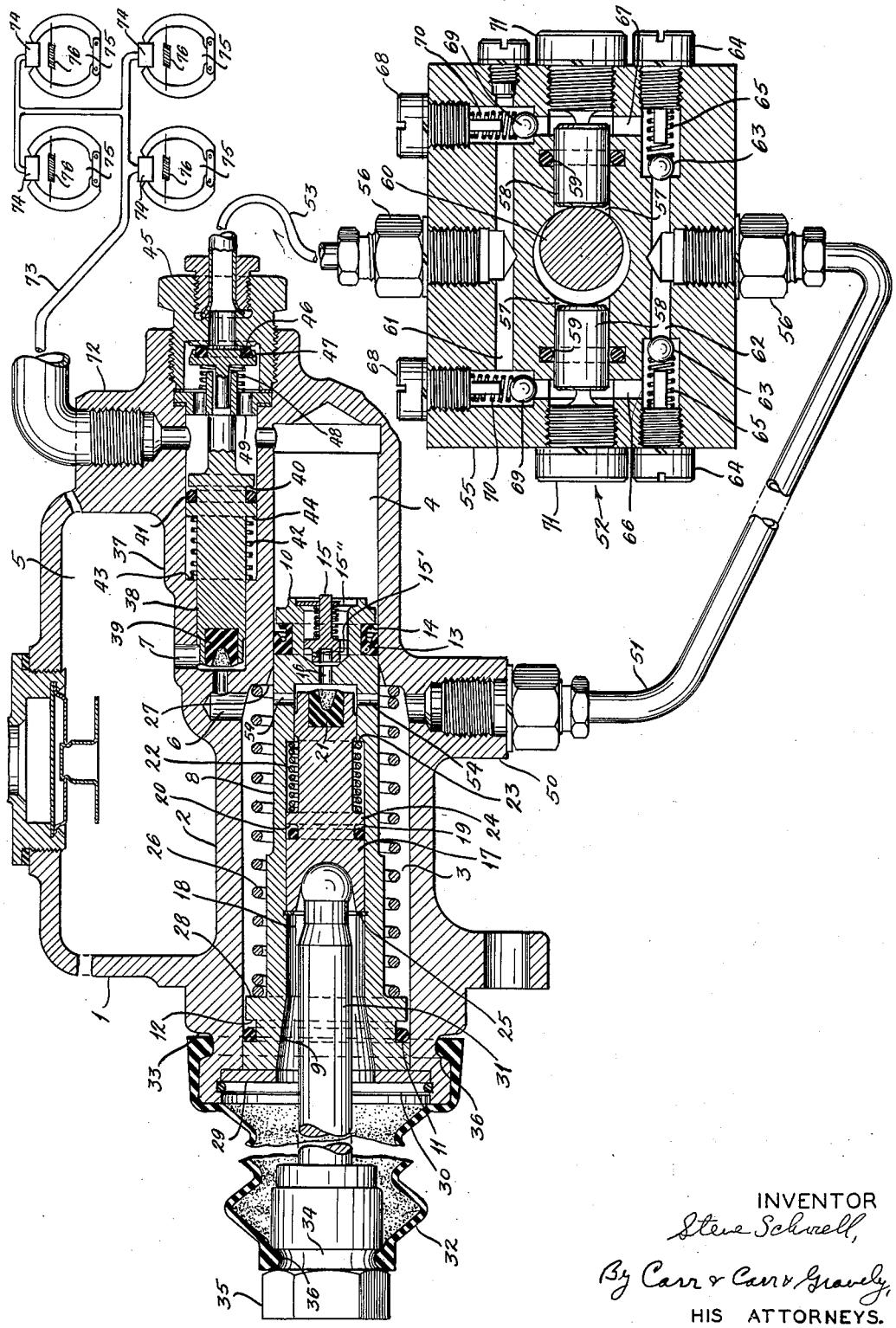
INVENTOR
Steve Schnell,
By Carr & Carr & Gravely,
HIS ATTORNEYS.

Patented Apr. 28, 1953

2,636,349

UNITED STATES PATENT OFFICE 2,636,349

INJECTOR PUMP ASSISTED HYDRAULIC BRAKING SYSTEM

Steve Schnell, Kirkwood, Mo., assignor to Wagner Electric Corporation, St. Louis, Mo., a corporation of Delaware Application December 31, 1948, Serial No. 68,661

15 Claims. (Cl. 60—54.5)

This invention relates to hydraulic braking systems and is more particularly directed to a power assisted manually-operated hydraulic braking system that is employable in automotive vehicles or in other mechanisms in which such braking systems are required.

One of the objects of the invention is to provide a braking system comprising a power assisted manually-operated mechanism in which the braking effort is pressure-controlled and in which the manually-developed pressure is not always of the same value and in which, once the brakes are applied and some of the pressure partially released, they may be re-applied with a minimum of effort.

Another object of the invention is to provide a power assisted braking system in which, upon failure of the power-operated portion of the system, the first succeeding manual application of the brakes will require a normal manual effort but the subsequent manual applications made after partial pressure release of the brakes may be accomplished with a minimum of manual effort.

A further object of the invention is to provide a braking system consisting of a power-operated assisting device for a manually-controlled and operated braking system in which there will be no appreciable impulse transmitted to the manually-operated portion of the system from the power-operated portion thereof.

A still further object of the invention is to provide a manually-operated power-assisted braking system for automotive vehicles which can be operated independently of the power-assisted portion of the system for accomplishing braking before a predetermined lower limit of the pressure is developed in the manually-controlled portion thereof which produces a more sensitive braking system, making possible the application of brakes without utilizing the amplifying effect of the power-assisted portion of the braking system.

This invention consists of a master cylinder provided with a stepped bore having a two-diameter piston slidable therein. A fluid reservoir is associated with the cylinder and a valve controls communication between the reservoir and the cylinder. A valve is mounted in the piston that is actuated by the means for advancing the piston controlling communication between the two bores of the cylinder. A check valve is mounted in one end of the piston for entrapping fluid in the smaller piston bore and compensating passageways are associated with the latter for the fluid therein. The smaller cylinder bore is connected to the brake operating motors and the pressure that actuates said motors also actuates the valve for preventing communication between the reservoir and the cylinder bore. An injector pump is connected to the smaller bore through suitable check valves for increasing the pressure in the smaller bore, the fluid for the pump being supplied from the larger bore in the cylinder, it being forced into the pump under pressure past pump intake valves. All movable parts are restored to their initial positions by return springs.

The single figure of the drawing illustrates a braking system in which the master cylinder and the injector pump connected thereto are shown in section.

The master cylinder assembly for the braking system comprises a casing 1 having a cylinder 2 formed therein provided with coaxial bores 3 and 4, the latter having a diameter smaller than that of bore 3. A reservoir 5 for brake fluid is formed in one part of the casing and communication is established between reservoir 5 and bore 3 by means of passageways 6 and 7.

A piston 8 provided with heads 9 and 10 is slidably mounted in the bores in cylinder 2, head 9 being slidable in bore 3 and head 10 slidable in bore 4. A sealing ring 11 is placed in an external groove 12 formed in head 9 and a sealing ring 13 is placed in an external groove 14 formed in piston head 10, the sealing rings preventing escape of pressure fluid from the respective cylinder bores. A check valve 15 is positioned in the forward part of head 10 and is so placed as to allow a rapid displacement of fluid from bore 3 to bore 4 through a passageway 16. Valve 15 is provided with compensating ports 15' and 15'' for the purpose of relieving pressure in bore 4. Valve 17 is slidably received in a bore 18 formed in piston 8 and is provided with a sealing ring 19 disposed in an external groove 20 on valve 17. A rubber cup insert 21 is mounted in the forward end of valve 17 and controls communication between passageway 16 and the cylinder bore 3 through passageways 54. A spring 22 is placed about valve 17 and at one end abuts against a shoulder 23 formed in piston 8, the other end abutting against a collar 24 formed on valve 17. Rearward motion of valve 17 is limited by means of an internal collar 25 mounted in bore 18. Rearward motion of the piston 8 is accomplished by a spring 26, one end of which abuts against a shoulder 27 formed in cylinder 2, the other end abutting against a collar 28 formed on piston 8. The said rearward motion is assisted by any pressure built up in bore 4 by fluid returned thereto from the motors 74 connected to bore 4. Rearward motion of piston 8 is limited by means of a flange plate 29 mounted in the end of cylinder 2 and retained therein by an annular expansion spring 30 seated in an internal groove formed in the cylinder.

Forward motion of valve 17 and its cup insert 21, as well as the piston 8, is accomplished by means of a piston rod 31 actuated by a brake pedal (not shown). A flexible boot 32 is placed about the piston rod 31, one end fitting into an external groove 33 in cylinder 2, its opposite end received in a groove 34 formed in head 35 mounted on rod 31, the boot being provided with suitable beads 36 that are received in grooves 33 and 34. If desired, suitable clamping rings may be placed about each end of the boot for firmly clamping the beads in grooves 33 and 34. The casing 1 is provided with a cylinder 37 in which a valve 38 is slidably received. A rubber cup insert 39 is mounted in the valve and controls communication between passageways 6 and 7. The valve 38 is provided with an external groove 40 for receiving a sealing ring 41 for preventing leakage of pressure fluid. A spring 42 is disposed about valve 38, one end of which abuts a shoulder 43 formed in cylinder 37, the other end abutting external collar 44 formed on valve 38. The bore of cylinder 37 extends axially through the wall of casing 1 and is enlarged for receiving a fitting 45 threaded into the tapped end of the cylinder bore. The fitting 45 is provided with a valve seat 46 engaged by a valve 47 that is urged thereagainst by means of a spring 48 one end of which abuts valve 47, the other end abutting a secondary fitting 49 assembled in the cylinder bore.

The cylinder 2 is provided with a boss 50 having a bore therein for establishing communication with bore 3. One end of a conduit 51 is connected in the bore in boss 50, the other end being connected to the intake side of the injector pump 52. A conduit 53 is connected between the outlet side of pump 52 and the bore in fitting 45. The pump is, therefore, in communication with the reservoir 5 by means of passageways 6 and 7, bore 3, conduit 51, and in communication with bore 4 through conduit 53 and the bore in cylinder 37. Communication is also established between reservoir 5 and the bore 4 by means of passageways 6 and 7, bore 3, passageways 54 cut in piston 8, and passageway 16. The various passageways are controlled by valves 17, 38 and 47. The cooperation of these various valves will be hereinafter set forth.

The injector pump 52 comprises a casing 55 into which suitable fittings 56 are threaded in which conduits 51 and 53 are received. The casing 55 is provided with a pair of oppositely disposed coaxial bores 57 in which pistons 58 are slidably received. The bores are provided with internal grooves in which sealing rings 59 are received for the purpose of preventing leakage between pistons 58 and the walls of bores 57. The pistons are actuated in one direction by a cam 60 driven from the prime mover for the automotive vehicle and reversely actuated by pressure fluid derived from the master cylinder. The casing 55 is further provided with passageways 61 and 62 communicating with conduits 53 and 51 respectively. The passageway 62 is counterbored at each end and valves 63 are seated on the shoulder between the bore and each counterbore. The counterbores are tapped for receiving plugs 64 and springs 65 are disposed between each of the valves 63 and plugs 64 for maintaining the valves in engagement with their seats, the valves functioning as check valves for allowing fluid to be discharged into passageways 66 and 67 from passageway 62 but preventing its return thereto. The passageways 66 and 67 connect passageways 61 and 62. Each of the passageways 66 and 67 is counterbored, each counterbore being tapped in order to receive plugs 68. Valves 69 are disposed in the counterbores and seat on the shoulders connecting the counterbores with the bore and have springs 70 interposed between plugs 68 and valves 69 for the purpose of keeping the valves in engagement with their seats. The bores 57 are counterbored and tapped for receiving plugs 71 for the purpose of permitting pistons 58 to be removed as well as limiting the outward motion thereof.

The outlet for cylinder bore 4 consists of a bore formed in a boss 72 in which one end of conduits 73 is connected, the other end terminating in brake motors 74 of the brake assemblies 75. The brake shoes and the brake motors 74 are restored to their initial positions by means of springs 76 associated with each of the brake assemblies.

The parts of the system are assumed to be in the position shown in the figure prior to operation thereof and all cylinder bores, conduits, etc. completely filled with fluid.

The operation of the invention is initiated by depressing the brake pedal which will advance piston rod 31, moving the valve 17 in bore 18, thereby closing passageway 16 for the purpose of shutting off communication between cylinder bores 3 and 4. Upon the seating of valve 17 further movement of piston rod 31 will move the piston 8 forwardly, thus placing the fluid in bore 4 under pressure and displacing fluid from bore 3 through passageways 6 and 7 into the reservoir 5. As the pressure in bore 4 is further built up, it will move valve 38 against spring 42 in cylinder 37, thus closing the connection between passageways 6 and 7. Continued forward motion of piston 8 now transfers fluid from bore 4 to the brake motors 74 through conduit 73 and at the same time transmits fluid from bore 3 through conduit 51 and past check valve 63 into the injector pump 52. The opening of valves 63 permits the pressure fluid to move into passageways 66 and 67, thus selectively moving pistons 58, depending upon the position of cam 60. Assuming the cam to be in the position illustrated in the drawing, the pressure fluid will move piston 58 to the right into engagement with the cam, thereby allowing the space in bore 57 that is in communication with passageway 66 and formerly occupied by the piston, to fill with fluid. Rotation of cam 60 will move piston 58 to the left, thereby placing the fluid in passageway 66 under a higher pressure, closing one of the check valves 63, and opening valve 69 for forcing fluid under pressure higher than that in conduit 51, into conduit 53. The higher pressure fluid now in conduit 53 will open valve 47 and allow fluid to enter the cavity behind valve 38 which is in communication with bore 4, thus raising the pressure therein and, consequently, in the brake motors 74 connected thereto by conduit 73. This action will continue alternately from either of the pistons 58 in the injector pump 52 as long as the pressure developed in bore 3 is sufficient to supply fluid to the injector pump 52 through check valves 63. As soon as pressure equilibrium is established on opposite sides of the aforesaid check valve 63, the injector pump will cease to increase the pressure in bore 4. However, any pressure so produced in bore 4 will be maintained until further movement of the piston rod 31.

When it is desired to completely release the pressure in motors 74 it is only necessary to release the foot pedal whereupon the pressure in motors 74 and conduit 73 will act for moving fluid into bore 4, thus moving piston 8 to the left until it is stopped by the flange plate 29 after which spring 22 and the pressure in passageway 16 causes valve 17 to open by moving it to the left against the internal collar 25. It should be observed that at this moment there is still pressure in the bore 4 sufficient to cause valve 38 to remain closed, thus sealing bore 3 from the reservoir 5. Since, under this condition, fluid was removed from bore 3 in the forward stroke, a vacuum exists in bore 3. Upon the opening of valve 17, however, the fluid that has been pumped into the fluid motors 74, the conduit 73 and bore 4 can proceed through compensating ports 15' and 15" located in valve 15, thence through passageway 16 and passageways 54 into bore 3, thus allowing a smooth flow of fluid until the pressure has dropped sufficiently for valve 38 to open, thereby allowing such additional fluid as is necessary to fill bore 3 to enter from reservoir 5. It should be noted that during the release of pressure the check valve 47 will prevent any fluid from the brake system or bore 4 being bypassed into conduit 53. The complete return of the brake shoes of the brake assembly 75 is caused by springs 76 which are strong enough to force the brake shoes to return to a predetermined stop position upon release of pressure. It should also be observed that no fluid can leave bore 4 through the passageway 16 upon release of braking pressure until such time as valve 17 has been unseated. A vacuum has been created in bore 3 by reason of the return movement of piston 8 and is retained therein until valves 17 and 38 have been opened.

If, at any time, a quantity of fluid is required to be transferred from bore 3 to bore 4 without movement of piston 8, the valve 15 is provided to allow a rapid transfer of fluid in the direction of bore 3 to bore 4 through passageway 16. As stated above, any flow of fluid from bore 4 to bore 3 must necessarily pass through the compensating ports 15' and 15". The valve 15 is used to insure that under all conditions of operation the bore 4 and all conduits connected thereto, will be filled with fluid, it being assumed that reservoir 5 is located at a higher elevation than the remainder of the system.

Assume now that a brake application has been made, as described above, and that it is desired to lower the pressure applied to motors 74 without completely releasing the braking pressure applied thereto. This is accomplished by allowing piston rod 31 to move slightly to the left, thereby increasing the volume in bore 4 and creating a vacuum in bore 3. By the increase of volume in bore 4, the pressure in conduit 73 and in bore 4 is reduced while valves 38, 47 and 17 remain closed. The braking pressure may be reduced in this manner by an amount such that piston 8 moves to the left until it just contacts the flange plate 29 while valve 17 is still maintained closed by the action of piston rod 31. The pressure in bore 4, conduit 73 and motors 74 will now remain at such reduced pressure so long as no further movement of piston rod 31 is accomplished. Now having the fluid entrapped in the system consisting of bore 4, conduit 73 and the fluid motor 74, in order to again raise the pressure by any desired amount up to the highest pressure that has been developed during this particular application, it is merely necessary to move piston 8 to the right, as in any ordinary brake. Since there is a vacuum in bore 3, there is no fluid supplied to the injector pump and, consequently, no action in supplying additional fluid to the braking system but, should it be desired to increase the braking pressure beyond that at which the previous application was a maximum, it is only necessary to move piston 8 beyond its extreme limit of travel on the previous stroke, thus supplying fluid to the injector pump and into the system.

Another type of operation is possible with this system, namely, under the condition that the injector pump 52 is not operating. This condition might exist as the result of the engine of the vehicle not running, or possibly because the driving means between the pump and the engine has become disconnected. Under this condition, in applying the brake, pressure is applied by the foot pedal to the piston rod 31 which closes valve 17, then moves piston 8 to the right, thus increasing the pressure in bore 4 and at the same time displacing fluid from bore 3 through passageways 6 and 7 into reservoir 5. As soon as sufficient pressure has been built up in bore 4, valve 38 will close, thereby causing the passageway from bore 3 to the reservoir 5 to be closed. Further motion of piston 8 to the right causes the fluid in bore 4 to be transmitted to brake motors 74 through conduit 73, and the fluid in bore 3 to be transmitted through conduit 51, check valves 63 and 69, conduit 53 and valve 47 into bore 4, thence into conduit 73 and to motors 74. By this means it is possible to manually raise the brake pressure to a value equal to that obtainable in bore 3. Having thus raised the pressure in brake motors 74 to this value of pressure, the brakes may now be operated as described previously for reducing the pressure applied to the brakes without completely releasing said pressure and again increasing the same with a minimum of manual effort as hereinbefore explained.

It is, therefore, evident that one advantage of this system is that, should the injector pump fail for any cause, the braking system does not become inoperative but only its available maximum braking effort is reduced.

Certain other operational advantages are accomplished in the above structure. During the initial application of the brake, the pressure system is sealed off from the reservoir, therefore limiting the operation of the injector pump to the pumping of fluid supplied from the bore 3. The valve 15 with its compensator ports 15' and 15" serves to control the communication between passageway 16 and bore 4 for preventing sudden release of pressure from bore 4 but allowing rapid ingress of fluid into bore 4 if necessary. The ports in valve 15 also accommodate and compensate for the heating of fluid and its consequent expansion by reason of brake application or any other condition. All passageways and valves between reservoir 5 and the brake motors 74 are open except during the interval of brake application and, therefore, there is no difference in pressure between the chambers in the master cylinder and the brake motors, thus enabling fluid to freely circulate throughout the entire brake system.

What I claim is:

1. A braking system comprising a master cylinder provided with a bore and a counterbore; a reservoir having fluid therein and associated with said cylinder; a piston provided with two heads slidable in said bore and counterbore respectively; a brake operating motor; means for establishing communication between said bore and said motor; means for moving said piston in said bores; means for establishing communication between said reservoir and said counterbore; means for establishing communication between said bore and counterbore; a valve responsive to pressure in said bore for preventing communication between said reservoir and said counterbore; valve means operable by said piston moving means for preventing communication between said bores; and means for increasing the pressure in said bore with fluid derived from said counterbore.

2. A braking system comprising a master cylinder provided with a bore and a counterbore; a reservoir having fluid therein and associated with said cylinder; a piston provided with two heads slidable in said bore and counterbore respectively; a brake operating motor; means for establishing communication between said bore and said motor; means for moving said piston in said bores; a pump; means for connecting said pump with said counterbore and said bore; means for establishing communication between said reservoir and said counterbore; means for establishing communication between said bore and counterbore; a valve responsive to pressure in said bore for preventing communication between said reservoir and said counterbore; valve means operable by said piston moving means for preventing communication between said bores; means for controlling the flow of fluid from said counterbore to said pump; and means for controlling flow of fluid from said pump to said bore.

3. A braking system comprising a cylinder provided with a bore and a counterbore; a reservoir having fluid therein and associated with said cylinder; a piston having two heads thereon positioned in the bores of said cylinder so that there is one head in each bore; a brake operating motor; an injector pump; means for establishing communication between said reservoir and said counterbore; means for establishing communication between said counterbore and said bore; means for establishing communication between said counterbore and said pump; means for establishing communication between said pump and said bore; means for establishing communication between said bore and said motor; means for actuating said piston; valve means operable by said piston actuating means for controlling communication between said bore and counterbore; valve means responsive to pressure in said bore for preventing communication between said reservoir and said counterbore; valve means responsive to pressure in said counterbore for controlling communication between said counterbore and said pump; and valve means responsive to pump pressure for controlling communication between said pump and said bore.

4. A braking system comprising a master cylinder provided with a reservoir having fluid therein and a bore and a counterbore, the bore being smaller than said counterbore; a piston provided with two heads, one head slidably received in each bore and the other slidably received in said counterbore; means for moving said piston in said cylinder; a brake motor; an injector pump; means for establishing communication between the bore in said cylinder and said motor; means for establishing communication between said reservoir and said counterbore; means for establishing communication between said counterbore and said bore in said cylinder; means for connecting said pump between said counterbore and said bore; a valve actuatable by said piston moving means for preventing communication between said counterbore and bore; a valve responsive to pressure in said bore for preventing communication between said reservoir and said counterbore; valve means in said pump responsive to pressure in said counterbore for admitting fluid therefrom into said pump; check valve means for preventing return flow of fluid discharged from said pump into said counterbore; and means for establishing communication between said bore and counterbore for preventing sudden release of fluid from said bore.

5. A braking system comprising a master cylinder provided with a reservoir having fluid therein and having a bore and a counterbore, the bore being smaller than said counterbore; a piston provided with two heads, one head slidably received in each bore and the other slidably received in said counterbore; means for moving said piston in said cylinder; a brake motor; an injector pump; means for establishing communication between the bore in said cylinder and said motor; means for establishing communication between said reservoir and said counterbore; means for establishing communication between said counterbore and bore in said cylinder; means for connecting said pump between said counterbore and said bore; a valve actuatable by said piston moving means for preventing communication between said counterbore and bore; a valve responsive to pressure in said bore for preventing communication between said reservoir and said counterbore; valve means in said pump responsive to pressure in said counterbore for admitting fluid therefrom into said pump; and check valve means for preventing return flow of fluid discharged from said pump into said counterbore.

6. A braking system comprising a master cylinder having a bore and a counterbore; a reservoir having fluid therein associated with said master cylinder; a piston provided with two heads slidably mounted in said cylinder in which one head is slidable in each bore; a brake motor; means for establishing communication between said bore and said motor; means for establishing communication between said reservoir and said counterbore; means for establishing communication between said counterbore and said bore; a valve in said piston for controlling said last mentioned communication means; means for actuating said piston and the valve therein; valve means operable by pressure fluid in said bore for preventing communication between said counterbore and said reservoir; and means for increasing the pressure on the fluid in said bore and said motor beyond that caused by movement of said piston head in said bore.

7. A braking system comprising a master cylinder provided with a bore and a counterbore; a reservoir having fluid therein and associated with said cylinder; a piston provided with two heads slidably mounted in said cylinder in which one head is slidable in each bore; a brake motor;

means for establishing communication between said bore and said motor; means for establishing communication between said reservoir and said counterbore; means for establishing communication between said counterbore and said bore; a valve in said piston for controlling said last mentioned communication means; means for actuating said piston and the valve therein; a valve cylinder; and a valve slidable in said valve cylinder and operable by pressure fluid in said bore for controlling communication between said reservoir and said counterbore.

8. A braking system comprising a master cylinder provided with a bore and a counterbore; a reservoir having fluid therein and associated with said cylinder; a piston provided with two heads slidable in said bore and counterbore respectively; a brake operating motor; means for establishing communication between said bore and said motor; means for moving said piston in said bores; means for establishing communication between said reservoir and said counterbore; means for establishing communication between said bore and counterbore; a valve responsive to pressure in said bore for preventing communication between said reservoir and said counterbore; valve means operable by said piston moving means for preventing communication between said bores; a check valve in said head in said bore for controlling flow of fluid thereto; and port means associated with said valve for compensating for increases in volume of fluid in said bore when said valve operated by said piston moving means is unseated.

9. A braking system comprising a cylinder provided with a bore and a counterbore; a reservoir having fluid therein and associated with said cylinder; a piston having two heads thereon positioned in the bores of said cylinder so that there is one head in each bore; a brake operating motor; an injector pump; means for establishing communication between said reservoir and said counterbore; means for establishing communication between said counterbore and said bore; means for establishing communication between said counterbore and said pump; means for establishing communication between said pump and said bore; means for establishing communication between said bore and said motor; means for actuating said piston; valve means in said piston operable by said piston actuating means for controlling communication between said bore and counterbore; valve means responsive to pressure in said bore for preventing communication between said reservoir and said counterbore; valve means in said head in said bore for controlling pressure fluid therein; compensating port means associated with said last mentioned valve means; valve means responsive to pressure in said counterbore for controlling communication between said counterbore and said pump; and valve means responsive to pump pressure for controlling communication between said pump and said bore.

10. A braking system comprising a master cylinder provided with a reservoir having fluid therein and having a bore and a counterbore, the bore being smaller than said counterbore; a piston provided with two heads, one head slidably received in each bore and the other slidably received in said counterbore; means for moving said piston in said cylinder; a brake motor; an injector pump; means for establishing communication between the bore in said cylinder and said motor; means for establishing communication between said reservoir and said counterbore; means for establishing communication between said counterbore and bore in said cylinder; means for connecting said pump between said counterbore and said bore; a valve in said piston actuatable by said piston moving means for preventing communication between said counterbore and bore; a valve responsive to pressure in said bore for preventing communication between said reservoir and said counterbore; valve means in said pump responsive to pressure in said counterbore for admitting fluid therefrom into said pump; check valve means for preventing fluid discharged from said pump returning thereto; a check valve in said head in said bore for controlling flow of fluid therein; and compensating port means in said last mentioned valve for equalizing pressures in said bores when said piston is fully retracted.

11. A brake system comprising a master cylinder having a bore and a counterbore therein; a reservoir having fluid therein and associated with said master cylinder; a piston slidably mounted in said cylinder having two heads thereon, one head being positioned in each bore; a brake motor; a pump; means for establishing communication between said counterbore and said reservoir; means for establishing communication between said bore and said counterbore through said piston; means for establishing communication between said bore and said motor; means for controlling communication between said bore and said counterbore; means for controlling communication between said reservoir and said counterbore; means for increasing the pressure in said motor by pressure fluid derived from said pump, the pump being supplied with fluid derived from said counterbore; and check valve means associated with said communication means between said bore and said motor for enabling said brake motor to be operated from said master cylinder independently of said pump.

12. A brake system comprising a master cylinder provided with a fluid reservoir having fluid therein and having a bore and counterbore; a piston provided with two heads, one head slidably received in each of said bores; means for moving said piston in said cylinder; a brake motor; an injector pump; means for establishing communication between said reservoir and said counterbore; means for establishing communication between said bore and said motor; means for establishing communication between said bores in said cylinder; means for connecting said pump with said counterbore and said motor; a valve actuatable by said piston moving means for preventing communication between said bores; a valve responsive to pressure in said bore for preventing communication between said reservoir and said counterbore; valve means in said pump responsive to pressure in said counterbore for admitting fluid therefrom into said pump; check valve means for preventing the fluid discharged from said pump returning thereto; means for establishing communication between said bores for preventing sudden release of fluid from said bore; and means establishing communication between said bores for enabling fluid to flow therebetween for compensating pressure differentials between said bores.

13. A brake system comprising a master cylinder having a bore and a counterbore therein; a reservoir having fluid therein and associated with said master cylinder; a piston slidably mounted in said cylinder having two heads thereon, one head being positioned in each bore; a brake motor; a pump; means for establishing communication between said counterbore and said reservoir; means for establishing communication between said bore and said counterbore through said piston; means for controlling communication between said reservoir and said counterbore; means for establishing communication between said bore and said motor; means for increasing the pressure in said motor by pressure derived from said pump, the pump being supplied with fluid derived from said counterbore; and means for preventing escape of fluid from said bore when said piston head therein is retracted, the pressure in said bore capable of being reestablished with a minimum of effort.

14. A brake system comprising a master cylinder having a bore and a counterbore therein; a reservoir having fluid therein and associated with said master cylinder; a piston slidably mounted in said cylinder having two heads thereon, one head being positioned in each bore; a brake motor; a pump; means for establishing communication between said counterbore and said reservoir; means for establishing communication between said bore and said counterbore through said piston; means for controlling communication between said reservoir and said counterbore; means for establishing communication between said bore and said motor; means for increasing the pressure in said motor by pressure fluid derived from said pump, the pump being supplied with fluid derived from said counterbore; valve means in said piston for preventing escape of fluid from said bore when said piston head therein is retracted, the pressure in said bore capable of being reestablished with a minimum of effort; and means for establishing communication between said bore and counterbore.

15. A braking system comprising a master cylinder provided with a bore and a counterbore; a reservoir having fluid therein and associated with said cylinder; a piston provided with two heads slidable in said bore and counterbore respectively; a brake operating motor; means for establishing communication between said bore and said motor; means for moving said piston in said bores; a pump consisting of a casing having a pair of cylinder bores therein; a piston in each of said pump bores; means for connecting said pump with said counterbore and said bore; check valve means associated with said connecting means for restricting the fluid to a unidirectional flow; means for establishing communication between said reservoir and said counterbore; means for establishing communication between said bore and counterbore; a valve responsive to pressure in said bore for preventing communication between said reservoir and said counterbore; valve means operable by said piston moving means for preventing communication between said bores; means for controlling the flow of fluid from said counterbore to said pump; and means for controlling flow of fluid from said pump to said bore.

STEVE SCHNELL.

References Cited in the file of this patent

UNITED STATES PATENTS

| Number | Name | Date |
|---|---|---|
| 1,183,973 | Hewitt | May 23, 1916 |
| 1,786,633 | Rushmore | Dec. 30, 1930 |
| 1,921,590 | Staude | Aug. 8, 1933 |
| 2,055,046 | Phillips | Sept. 22, 1936 |
| 2,368,043 | Schnell | Jan. 23, 1945 |
| 2,398,165 | Stelzer | Apr. 9, 1946 |
| 2,495,151 | Vickers | Jan. 17, 1950 |

FOREIGN PATENTS

| Number | Country | Date |
|---|---|---|
| 515,709 | Great Britain | Dec. 12, 1939 |